US012700334B2

(12) United States Patent
Minnotte

(10) Patent No.: US 12,700,334 B2
(45) Date of Patent: *Aug. 4, 2026

(54) LIGHT SENSITIVE DISPLAY SYSTEM

(71) Applicant: Christin Paige Minnotte, Palm Beach Gardens, FL (US)

(72) Inventor: Christin Paige Minnotte, Palm Beach Gardens, FL (US)

( * ) Notice: Subject to any disclaimer, the term of this patent is extended or adjusted under 35 U.S.C. 154(b) by 125 days.

This patent is subject to a terminal disclaimer.

(21) Appl. No.: 18/910,657

(22) Filed: Oct. 9, 2024

(65) Prior Publication Data

US 2025/0037619 A1 Jan. 30, 2025

Related U.S. Application Data

(63) Continuation of application No. 17/851,906, filed on Jun. 28, 2022, now Pat. No. 12,142,165.

(60) Provisional application No. 63/216,311, filed on Jun. 29, 2021.

(51) Int. Cl.

| | |
|---|---|
| ***G09F 13/00*** | (2006.01) |
| ***G09F 13/04*** | (2006.01) |
| ***G09F 13/08*** | (2006.01) |
| ***G09F 19/16*** | (2006.01) |

(52) U.S. Cl.

CPC .............. *G09F 19/16* (2013.01); *G09F 13/08* (2013.01)

(58) Field of Classification Search

CPC .......... G09F 13/04; G09F 13/08; G09F 13/14; G09F 13/12; G09F 13/16

See application file for complete search history.

(56) References Cited

U.S. PATENT DOCUMENTS

| | | | |
|---|---|---|---|
| 3,085,474 | A | 4/1963 | Bourgeaux et al. |
| 3,694,945 | A | 10/1972 | Detiker |
| 4,261,649 | A | 4/1981 | Richard |
| 4,262,206 | A | 4/1981 | Mehmann |
| 4,766,684 | A | 8/1988 | Wah Lo |

(Continued)

FOREIGN PATENT DOCUMENTS

JP 5596588 B2 9/2014

OTHER PUBLICATIONS

PCT International Search Report dated Oct. 5, 2022 issued in PCT International Application No. PCT/US2022/035437 filed on Jun. 29, 2022.

*Primary Examiner* — Shin H Kim

(74) *Attorney, Agent, or Firm* — Sagacity Legal PLLC

(57) ABSTRACT

A light sensitive display system for creating an artistic display is disclosed. The light sensitive display system includes a light permeable member and a reflective surface. The light permeable member includes a first side configured to be exposed to the external source of light and a second side opposed to the first side, and at least a portion of the first side includes a translucent material in the form of an artwork, artistic pattern, or an image. The translucent material is applied to the first side using one or more techniques selected from the group consisting of affixing, printing, painting, and coating. When the light sensitive display system is exposed to the external source of light, light diffuses through the light permeable member and reflects from the reflective surface to cause irradiation of the translucent material and diffused transmission of the light through the translucent material, to create an artistic display.

21 Claims, 9 Drawing Sheets

(56) References Cited

U.S. PATENT DOCUMENTS

| | | | | |
|---|---|---|---|---|
| 5,681,509 | A * | 10/1997 | Bailey ................. | B01F 23/2331 261/87 |
| 5,721,795 | A | 2/1998 | Pelka | |
| 6,212,805 | B1 | 4/2001 | Hill | |
| RE37,186 | E * | 5/2001 | Hill ......................... | B44C 1/105 428/137 |
| 6,490,819 | B1 | 12/2002 | Kumata et al. | |
| 6,681,509 | B1 | 1/2004 | Jean | |
| 6,744,960 | B2 | 6/2004 | Pelka | |
| 7,208,007 | B2 | 4/2007 | Nightingale et al. | |
| 7,230,767 | B2 | 6/2007 | Walck et al. | |
| 7,850,359 | B2 | 12/2010 | Jeng et al. | |
| 8,245,424 | B2 | 8/2012 | Hill | |
| 8,351,750 | B2 | 1/2013 | Fine et al. | |
| 8,591,052 | B2 * | 11/2013 | Wheatley .......... | G02F 1/133615 362/249.02 |
| 8,642,977 | B2 | 2/2014 | Comerford et al. | |
| 8,718,437 | B2 | 5/2014 | Coe-Sullivan et al. | |
| 8,807,774 | B2 * | 8/2014 | Wheatley ............. | G02B 6/0058 362/633 |
| 9,263,605 | B1 | 2/2016 | Morgan et al. | |
| 10,907,027 | B2 | 2/2021 | Hayashi et al. | |
| 2004/0245763 | A1 | 12/2004 | Tramtoul | |
| 2005/0140927 | A1 | 6/2005 | Aeling et al. | |
| 2005/0151938 | A1 | 7/2005 | Onaga | |
| 2005/0210724 | A1 | 9/2005 | Grau | |
| 2008/0090063 | A1 | 4/2008 | Inokuma et al. | |
| 2008/0223438 | A1 | 9/2008 | Xiang | |
| 2009/0044861 | A1 | 2/2009 | Debije | |
| 2009/0199893 | A1 | 8/2009 | Bita | |
| 2010/0321919 | A1 | 12/2010 | Yang | |
| 2011/0199352 | A1 | 8/2011 | Wheatley | |
| 2011/0296726 | A1 | 12/2011 | Rinko | |
| 2012/0038841 | A1 | 2/2012 | Taheri et al. | |
| 2013/0100647 | A1 | 4/2013 | Sherman et al. | |
| 2014/0009912 | A1 * | 1/2014 | Wheatley .......... | G02F 1/133615 362/97.1 |
| 2018/0347200 | A1 | 12/2018 | Hooper | |
| 2021/0142926 | A1 * | 5/2021 | Hu ........................... | H01B 1/02 |
| 2021/0151216 | A1 * | 5/2021 | Yang ........................ | H01B 5/14 |
| 2022/0415221 | A1 * | 12/2022 | Minnotte ................ | G09F 13/12 |
| 2023/0177980 | A1 | 6/2023 | Sharp et al. | |

* cited by examiner

LIGHT SENSITIVE DISPLAY SYSTEM

CROSS-REFERENCE TO RELATED APPLICATIONS

The present application is a continuation of U.S. Non-Provisional application Ser. No. 17/851,906, filed Jun. 28, 2022, entitled “Light Sensitive Display System” which claims the benefit of U.S. Provisional Application No. 63/216,311, filed on Jun. 29, 2021, each of which is incorporated by reference herein in its entirety.

BACKGROUND OF THE INVENTION

In the field of artistic display, principles of light and interference are known to be applied to light sensitive materials to create light sensitive display systems. Such light sensitive display systems utilize different sources and angles of incident light to create artistic display. It is desirable to use the principles of light in combination with different light sensitive materials to create artistic displays.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
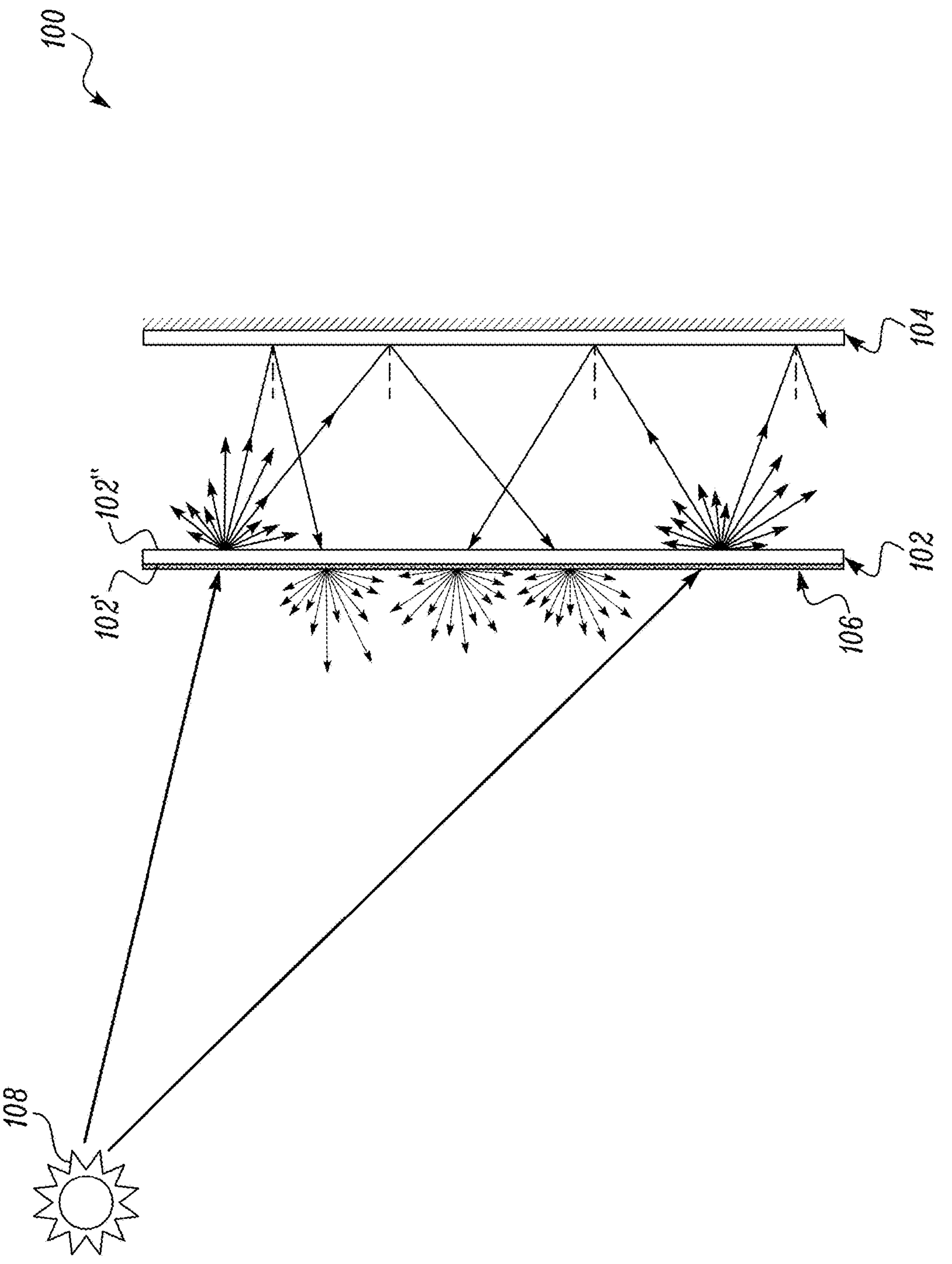
FIG. 1 is an exemplary illustration of a light sensitive display system and the working thereof in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments so as not to obscure the description with details that will be readily apparent to those of ordinary skill in the art having the benefit of the description herein.

DETAILED DESCRIPTION OF THE INVENTION

The embodiments described herein are related to a light sensitive display system that provides an artistic display when exposed to an external source of light.

In one aspect, a light sensitive display system for creating an artistic display upon exposure to an external source of light is described. The light sensitive display system comprises a light permeable member including a first side configured to be exposed to the external source of light and a second side opposed to the first side, and at least a portion of the first side includes a translucent material in the form of an artwork, artistic pattern, or an image. The translucent material is applied to the first side using one or more techniques selected from the group consisting of affixing, printing, painting, and coating. The light sensitive display system further comprises a reflective surface disposed sequentially with respect to the light permeable member. When the light sensitive display system is exposed to the external source of light, light diffuses through the light permeable member including the translucent material and reflects from the reflective surface to cause irradiation of the translucent material. This irradiation of the translucent material causes diffused transmission of light through the translucent material, to create an artistic display.

In another aspect, a method for manufacturing a light sensitive display system for creating an artistic display upon exposure to an external source of light is described. The method comprises providing a light permeable member including a first side configured to be exposed to the external source of light and a second side opposed to the first side, and at least a portion of the first side including a translucent material in the form of an artwork, artistic pattern, or an image. The translucent material is applied to the first side using one or more techniques selected from the group consisting of affixing, printing, painting, and coating. The method further comprises disposing a reflective surface in a sequential relationship with the light permeable member.

In yet another aspect, a method for producing an artistic display upon exposure to an external source of light is described. The method comprises providing a light permeable member including a first side configured to be exposed to the external source of light and a second side opposed to the first side, and at least a portion of the first side including a translucent material in the form of an artwork, artistic pattern, or an image. The translucent material is applied to the first side using one or more techniques selected from the group consisting of affixing, printing, painting, and coating. The method further comprises disposing a reflective surface in a sequential relationship with the light permeable member. The light permeable member is exposed to an external light source such that light diffuses through the light permeable member including the translucent material and reflects from the reflective surface to cause irradiation of the translucent material. This irradiation of the translucent material causes diffused transmission of light through the translucent material, to create an artistic display.

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101, and 201 could refer to one or more comparable components used in the same and/or different depicted embodiments.

Referring to FIGS. 1 through 6, a light sensitive display system 100 is shown and described. The light sensitive display system 100 can be one among the several light sensitive display systems disclosed in FIGS. 1 through 6. Various alternatives to the configurations of the light permeable member 102 and the reflective surface 104 in the light sensitive display system 100 are possible, and those that are described here are purely exemplary.

With continued reference to FIG. 1, details related to the light sensitive display system 100 are now described. The light sensitive display system 100 comprises a light permeable member 102 and a reflective surface 104 disposed sequentially with respect to the light permeable member 102. The light permeable member 102 includes a first side 102' and a second side 102". The first side 102' includes a translucent material 106. As illustrated in FIG. 1, when the light sensitive display system 100 is exposed to an external light source 108, light passes through the light permeable member 102 and reflects from the reflective surface 104 to cause irradiation of the translucent material 106 followed by diffused transmission through the translucent material 106, and result in an artistic display. During diffused transmission, the light reflected from the reflective surface 104 and passing through the light permeable member 102 including the translucent material 106 scatters in various directions. This softens, spreads, and scatters the light into multiple angles, thereby creating a glow.

In some embodiments, as exemplarily shown in FIG. 1, the light from the external light source after passing through the light permeable member 102 including the translucent material 106 diffuses or scatters before reflecting from the reflective surface 104.

The light permeable member 102 is composed of, but is not limited to one or more of glass, architectural glass, plexiglass, polycarbonate, mirrored polycarbonate, acrylics, plastics, fabric, paper, vinyl, resin, and any other similar material as is now known or in the future developed.

The reflective surface 104 is a mirror or a mirror-like surface. The reflective surface 104 is composed of, but is not limited to one or more of glass mirror, plexiglass mirror, mirrored polycarbonate, metals, two-way/one-way mirror, films, mirrored films or sheets, metal compounds, ceramics/ceramic coatings and any other similar material as is now known or in the future developed.

The translucent material 106 is composed of, but is not limited to inks, pigments, dyes, polymers, stained glass, paints, crystals, metal compounds, organic compounds, minerals, nano composites, and any other similar material as is now known or in the future developed. In some embodiments, the inks are selected from the group consisting of organic ink and inorganic ink. In some embodiments, the translucent material 106 is selected from the group consisting of ceramic ink and Ultra-violet (UV) curable ink. In an embodiment, the translucent material 106 is in the form of powder, film, or solution. The films include one or more of polymeric films, two-way mirror film, one-way mirror film, tinted films, and the like. The translucent material 106 is applied on the light permeable member 102 using any known technique of affixing, printing, painting, or coating now known or developed in future. In some embodiments, the light permeable member 102 includes at least two translucent materials 106. In some embodiments, the extent of translucency as well as color of the translucent material 106 are varied to vary the brightness, color, and tone of the artistic display.

Figure 7:
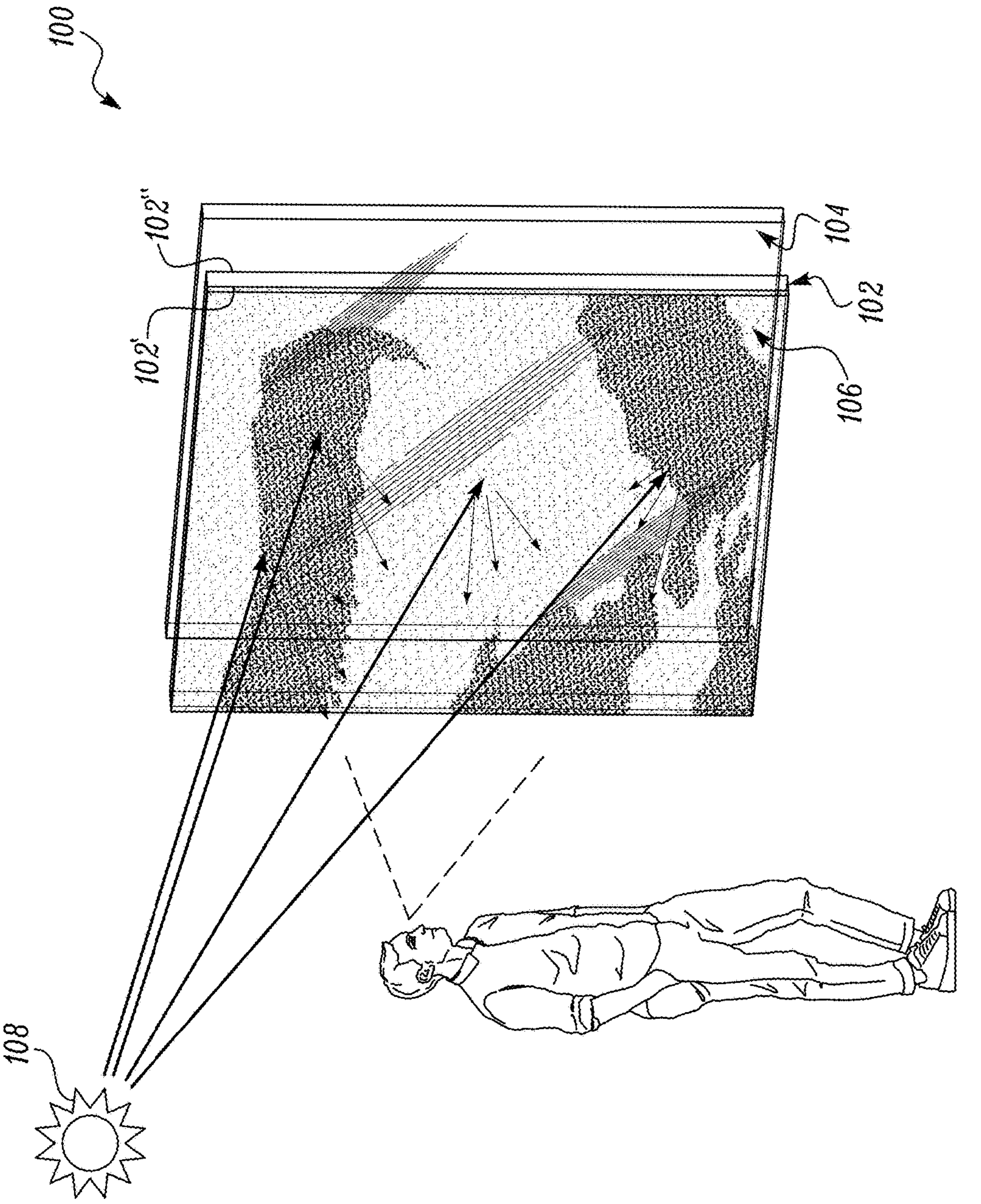
FIG. 7 shows an exemplary illustration of a light sensitive display system as observed by a person in accordance with an embodiment of the present disclosure.

The translucent material 106 is applied on the light permeable member 102 in the form of an artwork, artistic pattern, or image. As exemplarily shown in FIG. 7, the translucent material 106 is applied to the light permeable member 102 in the form of an artwork. In some embodiments, the translucent material 106 is applied on only a portion of the light permeable member 102.

The light permeable member 102 including the translucent material 106 can be disposed with the reflective surface 104 in various configurations. The various configurations are described below. While explaining the different configurations, reference to "light permeable member 102" means "light permeable member 102 including the translucent material 106".

As shown exemplarily in FIG. 1, the light permeable member 102 and the reflective surface 104 are disposed parallelly to each other. Alternatively, the reflective surface 104 and the light permeable member 102 are disposed in a non-parallel relationship to each other.

Figure 2:
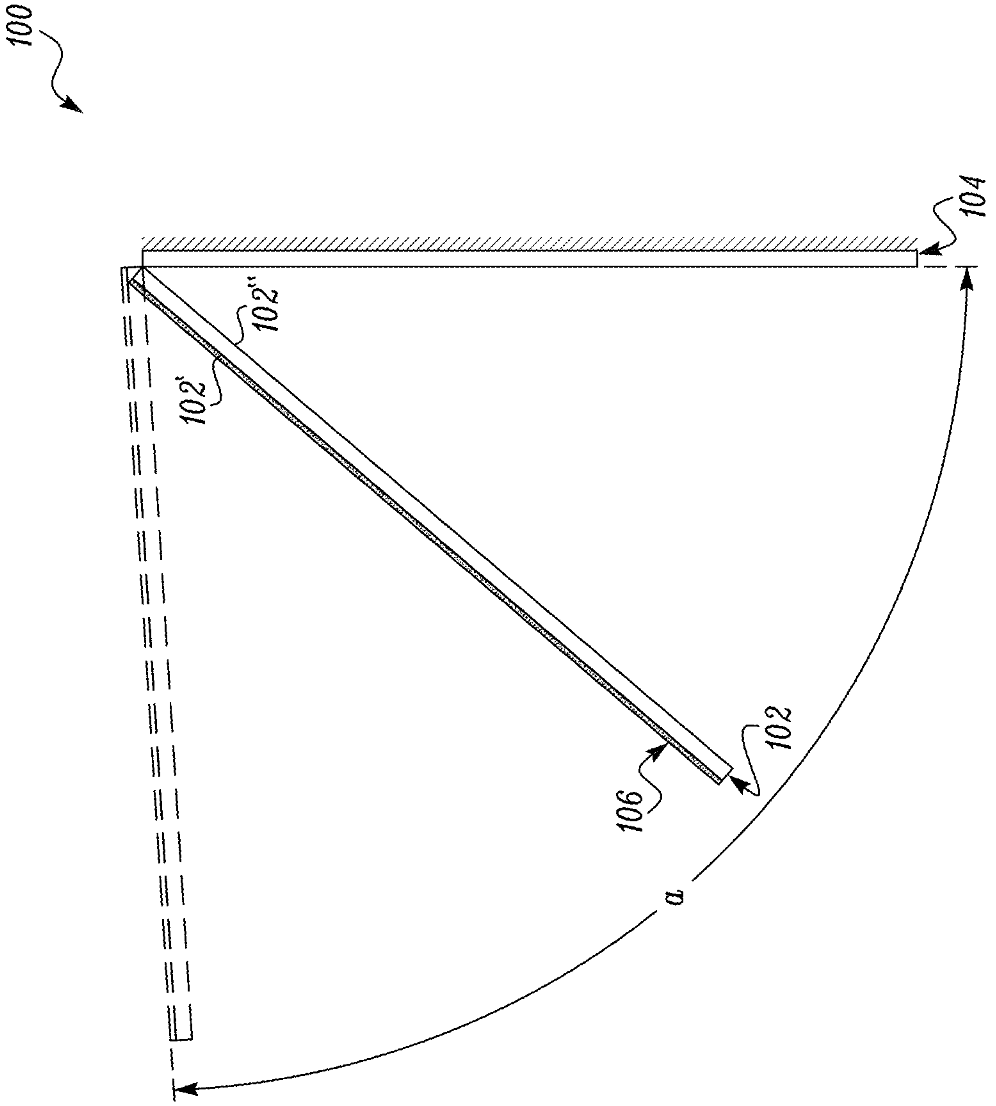
FIGS. 2 through 6 show an exemplary illustration of a light sensitive display system in accordance with various embodiments of the present disclosure.

Referring to FIG. 2, an exemplary light sensitive display system 100 is described. The light sensitive display system 100 comprises the light permeable member 102 positioned at an angle $\alpha$ with respect to the reflective surface 104. In some embodiments, the angle $\alpha$ varies from 0° (degrees) to fewer than 90° (degrees).

One or both the light permeable member 102 and the reflective surface 104 could be a non-planar surface. In some embodiments, the reflective surface 104 and the light permeable member 102 are disposed in a concave/convex-to-planar relationship or in a concave-to-convex relationship to each other for achieving variety of visual effects. For instance, the concave-to-planar relationship facilitates in achieving a haloed effect of lighter colors around edges of a planar light permeable member 102 corresponding to parts of a concave reflective surface 104. In another example, a deeper concave central section of the reflective surface 104 would project less intensity of light through the planar light permeable member 102. Thus, one of ordinary skill in the art shall appreciate that numerous variations of the visual effects can be achieved when the reflective surface 104 and the light permeable member 102 are disposed in different relationships to each other. Some of the relationships between the reflective surface 104 and the light permeable member 102 are described below.

Figure 3B:
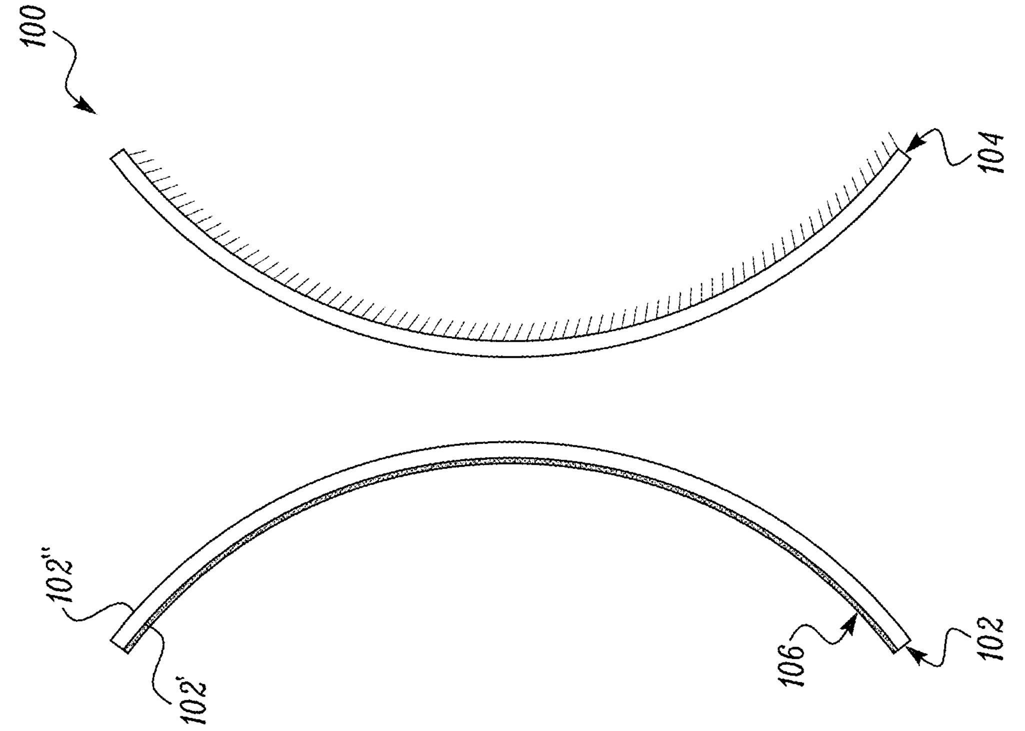
Figure 3A:
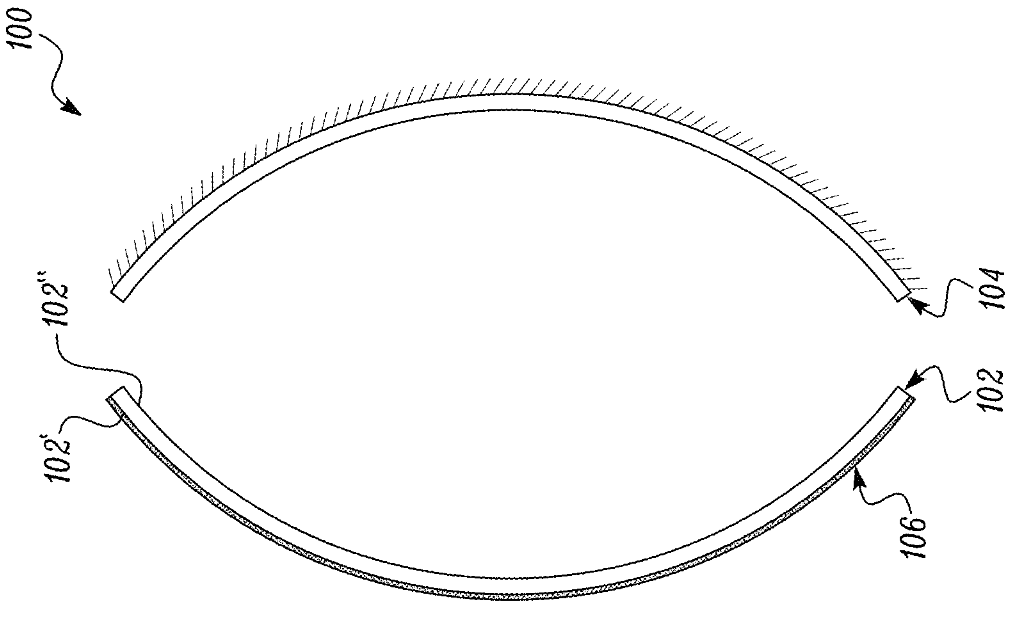
Figure 4B:
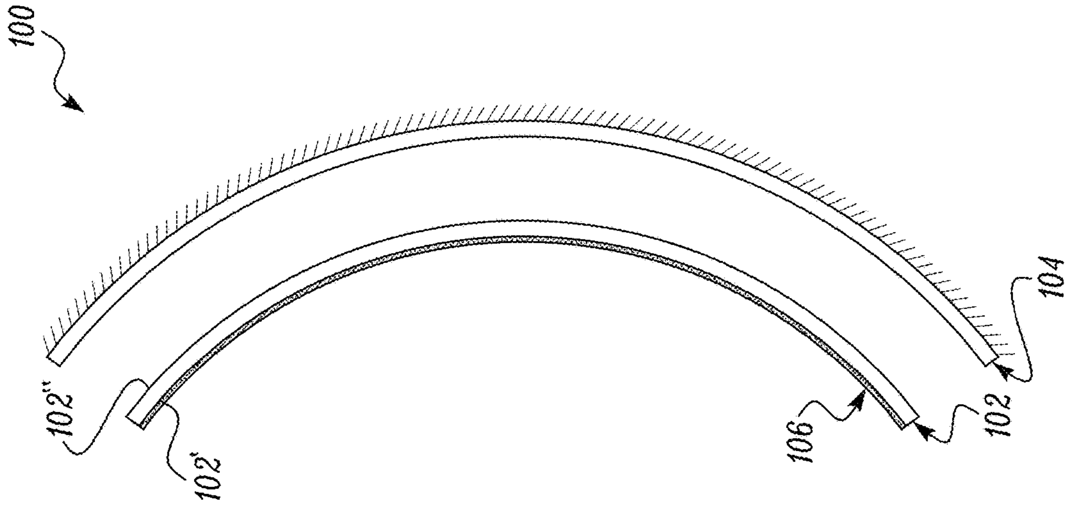
Figure 4A:
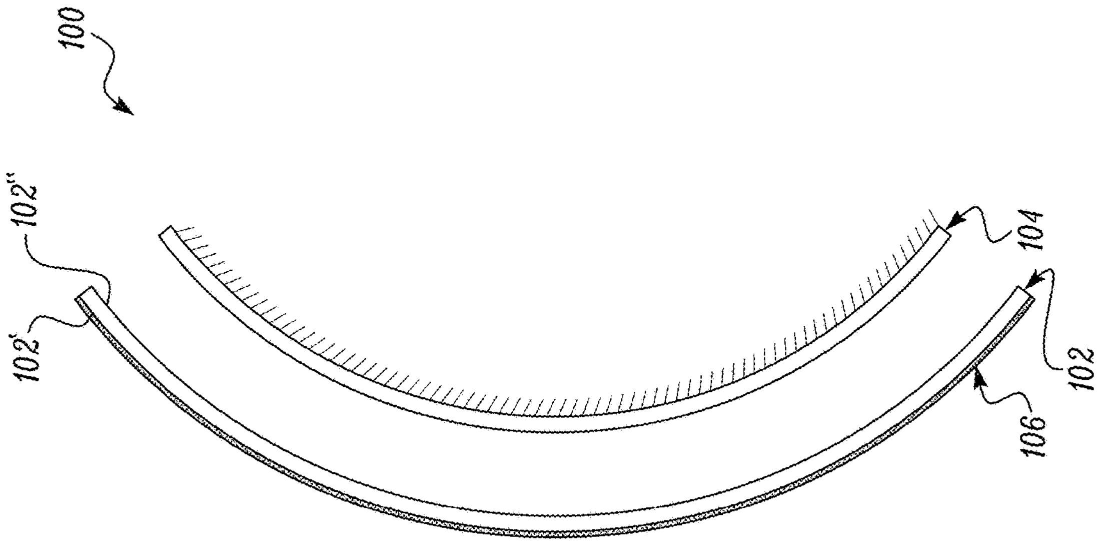

In FIGS. 3A and 3B and FIGS. 4A and 4B, for example, various embodiments of an exemplary light sensitive display system 100 is illustrated. As illustrated in FIG. 3A, the light sensitive display system 100 comprises the light permeable member 102 having a convex surface and reflective surface 104 has a concave surface. FIG. 3B illustrates the light sensitive display system 100 comprising the light permeable member 102 having a concave surface and the reflective surface 104 having a convex surface. FIG. 4A illustrates the light sensitive display system 100 comprising the light permeable member 102 and the reflective surface 104, both having a convex surface. FIG. 4B illustrates the light sensitive display system 100 comprising both the light permeable member 102 and the reflective surface 104, both having a concave surface.

Figure 5:
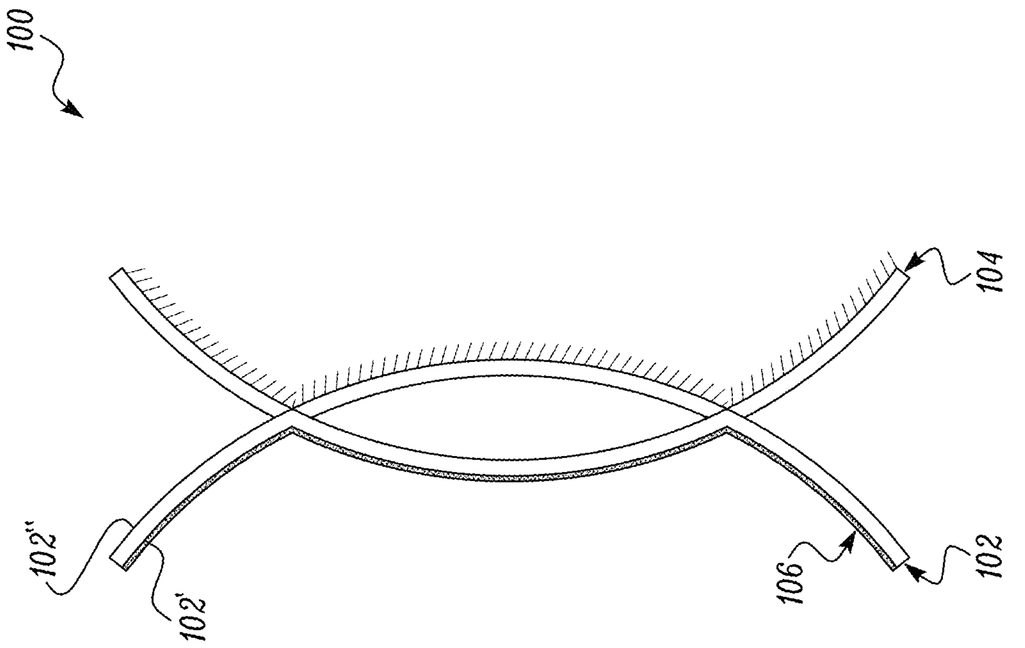

FIG. 5, for example, illustrates another embodiment of the light sensitive display system 100 comprising a partially concave and partially convex light permeable member 102 and, a partially concave and partially convex reflective surface 104.

Figure 6B:
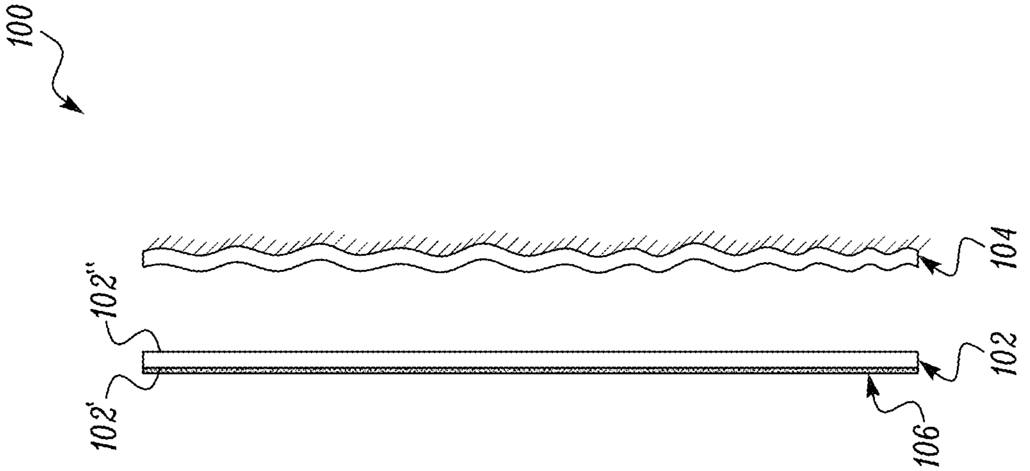
Figure 6A:
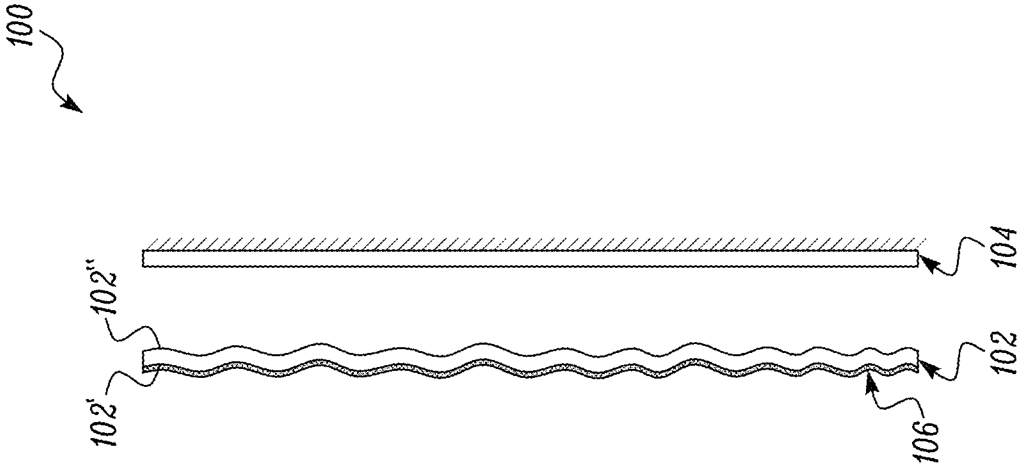

FIGS. 6A and 6B, for example, illustrate embodiments of a light sensitive display system 100 comprising a light permeable member 102 having a modulated surface and a reflective surface 104 having a planar surface (FIG. 6A), and a light sensitive display system 100 comprising a light permeable member 102 having a planar surface and a reflective surface 104 having a modulated surface (FIG. 6B).

The reflective surface 104 is disposed at a distance from the light permeable member 102. Exemplarily, the reflective surface 104 is disposed at a distance ranging between 0.125 to 0.25 inches from the light permeable member 102. As the distance between the light permeable member 102 and the reflective surface 104 is increased, the light sensitive display system exhibits deeper color and perceivable depth in visual display.

Figure 9:
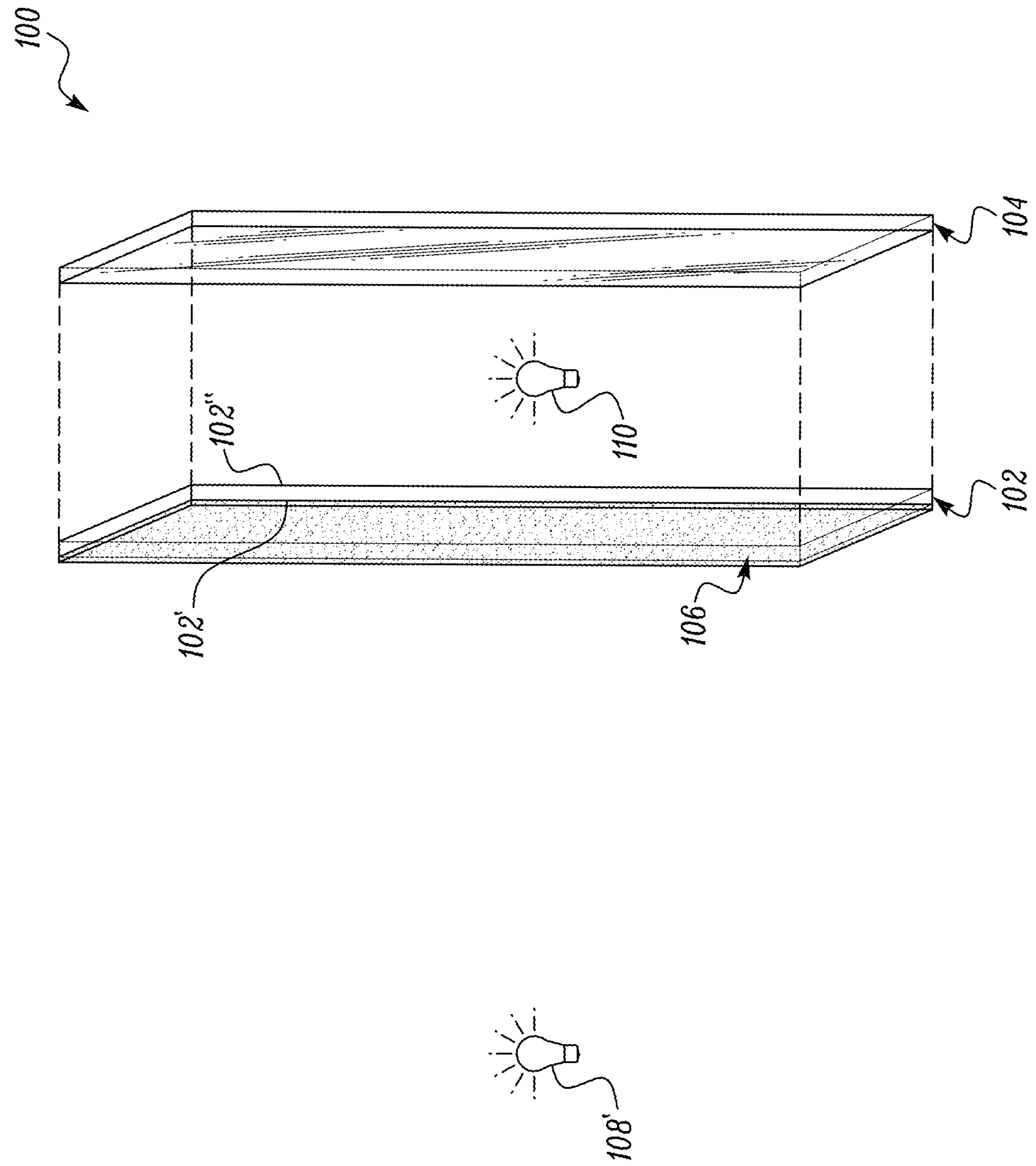
FIG. 9 shows an exemplary embodiment of a light sensitive display system comprising an internal source of light, in accordance with an embodiment of the present disclosure.

In some embodiments, the light sensitive display system 100 comprises an internal light source 110. The internal light source 110 is positioned anywhere between the light permeable member 102 and the reflective surface 104. The purpose of the internal light source 110 is to illuminate the light sensitive display system 100 from within during nighttime or in a dark environment. The internal light source 110 comprises any known artificial source of light including but not limited to incandescent lamps, lamps based on discharge of gas, and light-emitting diodes as is now known or in the future developed. FIG. 9, for example, shows an exemplary light sensitive display system 100 comprising an internal light source 110 placed between the light permeable member 102 and the reflective surface 104.

Figure 8:
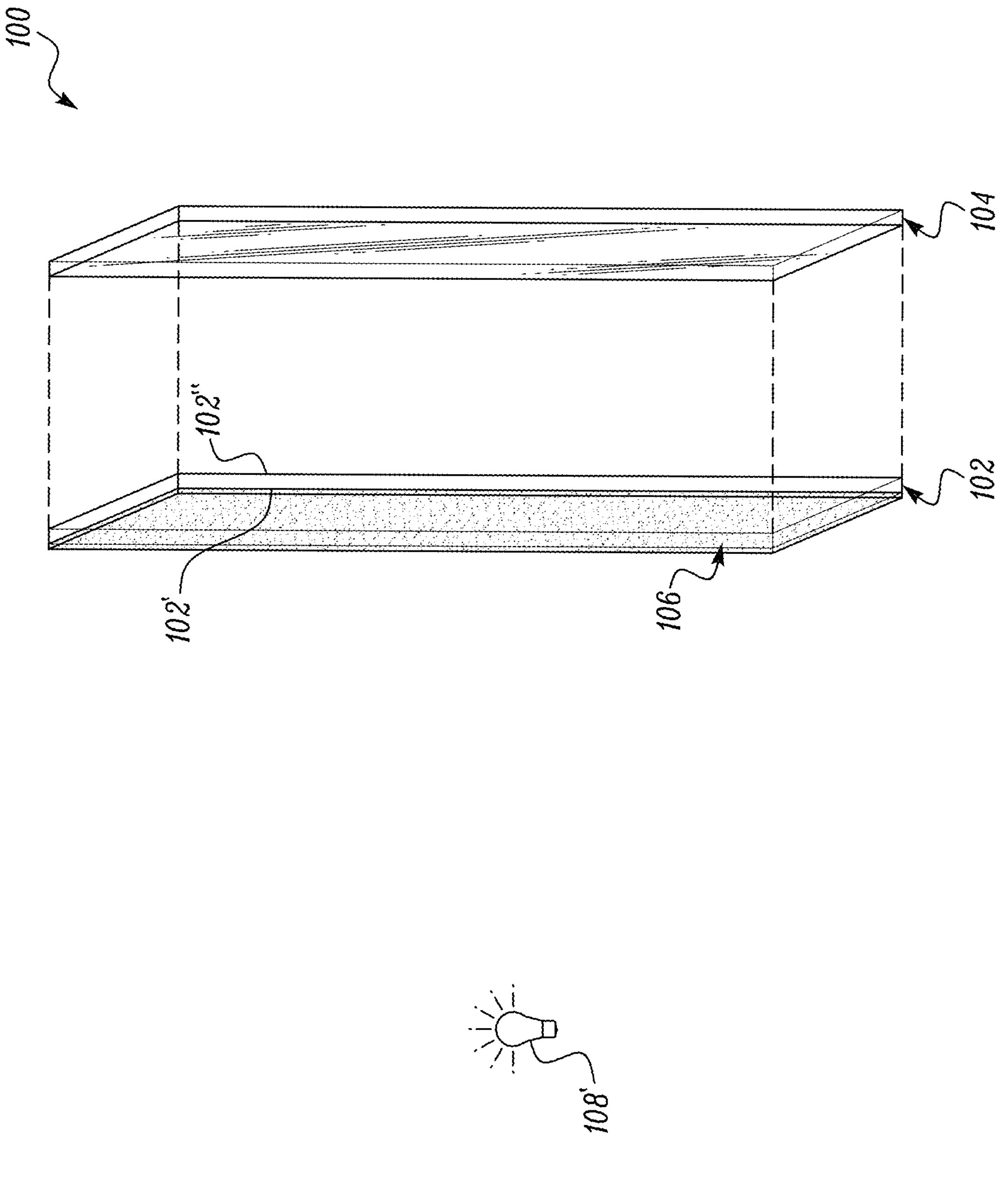
FIG. 8 shows an exemplary embodiment of a light sensitive display system exposed to an artificial source of light in accordance with an embodiment of the present disclosure.

The light sensitive display system 100 is configured to be exposed to an external light source 108. The external light source 108 includes but is not limited to sun, moon, or an artificial source of light 108'. The artificial source of light 108' includes but is not limited to incandescent lamps, lamps based on discharge of gas, and light-emitting diodes as is now known or in the future developed. FIGS. 8 and 9, for example, shows an exemplary light sensitive display system exposed to an artificial source of light 108', for example—an incandescent lamp. In some embodiments, the artificial source of light is a mobile or a static light source.

In some embodiments, the light sensitive display system 100 comprises a mechanism for energy collection (not shown) from the light reflected by the reflective surface 104 or light incident on the light permeable member 102 from the external light source 108, 108'. In an embodiment, the mechanism comprises use of one or more translucent materials 106 which collects usable energy from heat or changes in heat, and/or from electromagnetic radiation or changes in electromagnetic radiation. In another embodiment, the mechanism comprises positioning an energy converter or energy storage device anywhere between the light permeable member 102 and the reflective surface 104. The device includes but is not limited to photovoltaic cells (or solar cells), and any other similar device as is now known or in the future developed. A combination of two or more mechanisms for energy collection is possible and anticipated. In an embodiment, the mechanism for energy collection is used to power the internal source of light 110.

Based on the description above, it will be appreciated that the light sensitive display system 100 creates an artistic display. The present invention provides light sensitive display system 100 and method for creating an artistic display which can be used for applications across arts and commercial purposes. Particularly, the light sensitive display system 100 may be employed in any one of but not limited to art, windows, curtain wall, architectural surfaces, self-illuminating large scale architectural applications, interiors, and advertising display system.

The light sensitive display system 100 allows creating various types of artistic displays by varying the configuration and material of the light permeable member 102, translucent material 106, and reflective surface 104 in accordance with the teachings of present disclosure. A dynamic artistic display could be obtained by varying the angles of light incident on the light sensitive display system or the angle of view.

The light sensitive display system 100 can also facilitate in collecting energy from the light rays after being reflected from the reflective surface 104 or from the light incident on the light permeable member 102 from the external light source 108, 108'.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, front and rear, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A light sensitive display system for creating an artistic display upon exposure to an external source of light, the system comprising:

a light permeable member including a first side configured to be exposed to the external source of light and a second side opposed to the first side, at least a portion of the first side including a translucent material in the form of an artwork, artistic pattern, or an image, the translucent material applied to the first side using one or more techniques selected from the group consisting of affixing, printing, painting, and coating; and a reflective surface disposed sequentially with respect to the light permeable member, wherein when the light sensitive display system is exposed to the external source of light, light diffuses through the light permeable member including the translucent material and reflects from the reflective surface to cause irradiation of the translucent material and diffused transmission of the light through the translucent material, to create an artistic display.

2. The light sensitive display system of claim 1, wherein the light permeable member includes at least two translucent materials in the form of an artwork, artistic pattern, or an image.

3. The light sensitive display system of claim 1, wherein the translucent material included on the light permeable member has a varying translucency.

4. The light sensitive display system of claim 1, wherein the translucent material is in the form of powder, film, or solution.

5. The light sensitive display system of claim 1, wherein the translucent material is selected from the group consisting of dyes, ink, organic ink, and inorganic ink.

6. The light sensitive display system of claim 1, wherein the translucent material is selected from the group consisting of ceramic ink and Ultra-violet (UV) curable ink.

7. The light sensitive display system of claim 1, wherein the reflective surface is a mirror or a mirror-like surface.

8. The light sensitive display system of claim 1, wherein the reflective surface and the light permeable member are disposed in a parallel relationship to each other.

9. The light sensitive display system of claim 1, wherein the reflective surface and the light permeable member are disposed in a non-parallel relationship to each other.

10. The light sensitive display system of claim 1, wherein the reflective surface and the light permeable member are disposed in a concave/convex-to-planar or planar-to- concave/convex relationship with each other.

11. The light sensitive display system of claim 1, wherein the reflective surface and the light permeable member are disposed in one of concave-concave or convex-convex relationship with each other.

12. The light sensitive display system of claim 1, wherein one or both of the reflective surface and the light permeable member has a non-planar surface.

13. The light sensitive display system of claim 1, wherein the light permeable member is selected from the group consisting of glass, architectural glass, acrylics, fabrics, and plastics.

14. The light sensitive display system of claim 1, further comprising an internal light source disposed between the light permeable member and the reflective surface.

15. A method for manufacturing a light sensitive display system for creating an artistic display upon exposure to an external source of light, the method comprising:

providing a light permeable member including a first side configured to be exposed to the external source of light and a second side opposed to the first side, at least a portion of the first side including a translucent material in the form of an artwork, artistic pattern, or an image, the translucent material applied to the first side using one or more techniques selected from the group consisting of affixing, printing, painting, and coating; and disposing a reflective surface in a sequential relationship with the light permeable member.

16. The method of claim 14, further comprising disposing the reflective surface and the light permeable member such that they are in a parallel relationship to each other.

17. The method of claim 14, further comprising disposing the reflective surface and the light permeable member such that they are in a non-parallel relationship to each other.

18. The method of claim 14, further comprising disposing the reflective surface at a distance ranging between 0.125 to 0.25 inches from the light permeable member.

19. The method of claim 14, further comprising disposing an internal light source between the light permeable member and the reflective surface.

20. A method for creating an artistic display upon exposure to an external source of light, the method comprising:

providing a light permeable member including a first side configured to be exposed to the external source of light and a second side opposed to the first side, at least a portion of the first side including a translucent material in the form of an artwork, artistic pattern, or an image, the translucent material applied to the first side using one or more techniques selected from the group consisting of affixing, printing, painting, and coating; and disposing a reflective surface in a sequential relationship with the light permeable member, exposing the light permeable member to the external source of light such that light diffuses through the light permeable member including the translucent material and reflects from the reflective surface to cause irradiation of the translucent material and diffused transmission of the light through the translucent material, to create an artistic display.

21. The method of claim 20, further comprising disposing an internal light source between the light permeable member and the reflective surface.

* * * * *